Patented Nov. 29, 1938

2,138,809

UNITED STATES PATENT OFFICE 2,138,809

ACYLATED CONDENSATION PRODUCTS AND METHOD OF MAKING THEM

Orland M. Reiff and Darwin E. Badertscher, Woodbury, N. J., assignors to Socony-Vacuum Oil Company, Incorporated, New York, N. Y., a corporation of New York No Drawing. Application March 12, 1936, Serial No. 68,501

14 Claims. (Cl. 260—475)

This invention relates to novel compositions of matter, and more particularly to novel pour point depressants for mineral oils. Pour point depressants are compounds which possess the power, when admixed with a small percentage of a mineral oil comprising liquid oil and waxy constituents, of lowering the temperature at which the mineral oil congeals or ceases to flow.

This invention comprises novel compositions of matter resulting from first condensing together, by a chemical reaction, a hydroxyaromatic compound (i. e., a phenol) and a chlorinated aliphatic hydrocarbon of relatively high molecular weight, to form a heavy alkyl-substituted phenol, and thereafter chemically reacting the first condensation product with an acylating agent such as an acid chloride or an acid anhydride, to bring about the acylation of the heavy alkyl-substituted hydroxyaromatic compound.

This invention has for its object the provision of a new and novel class of organic compounds partaking generally of the nature of esterified (i. e., acylated) heavy alkyl-substituted hydroxyaromatic compounds. A further important object is the provision of a method of preparing these novel compounds.

By the expression hydroxyaromatic compounds or phenols we mean compounds having the following general formulae:

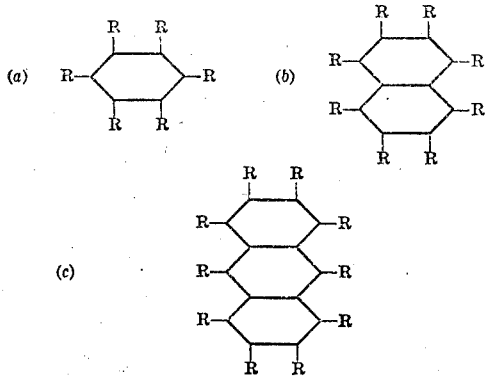

wherein at least one R is an hydroxy group and the remaining R's are radicals chosen from the group consisting of hydrogen, hydroxyl, alkyl, aryl, alkaryl, aralkyl, aroxy, and alkoxy radicals. In general it is preferred to use those compounds wherein the R's are selected from the group consisting of hydrogen, and hydroxy, preference being had for compounds of the single ring type of formula (a) wherein at least one of the R's is hydroxy and at least one of the R's is hydrogen, any remaining R's being selected from the group consisting of alkyl, aryl, aroxy, or alkoxy. Specific examples of this preferred group of hydroxyaromatic compounds found useful in preparing the finished product of the present invention are the following: Phenol, benzyl-phenol, resorcinol, o-hydroxydiphenyl, and B-naphthol. Examples of other compounds which may be used with good results are hydroquinone, catechol, xylenol, phenyl ethyl phenol, methyl-hydroxydiphenyl, ethyl hydroxydiphenyl, guaiacol, monoethyl ether of catechol, naphthalene diols, methyl naphthol, tolyl naphthol, xylyl naphthol, benzyl naphthol, methoxyhydroxy naphthalene, anthranol, phenyl methyl anthranol and the like. The relatively heavy aliphatic compounds referred to above with which this invention is concerned are typified by those commonly present in and which character the heavier products of petroleum, such as heavy lubricating oil, petrolatum, and crystalline petroleum wax, special preference being given to the crystalline petroleum wax of a melting point of 120° F. or higher, these compounds commonly having molecular weights in excess of about 250, and having more than about 20 carbon atoms. For use in the synthesis of the compounds with which this invention is concerned, these relatively heavy aliphatic compounds are first chlorinated. Such a chlorinated compound may be produced conveniently by melting petroleum wax having a melting point of about 130° F., heating it to a temperature of about 200° F. and bubbling chlorine through the liquid wax until it has combined with about 14% chlorine. The chlorination may be accelerated by employing higher temperatures, up to temperatures which result in an objectionable darkening and deterioration of the chlorinated product. The degree of chlorination is of considerable importance. A chlorination to the extent of about 14% is preferred. With substantially lower percentages of chlorine, the resulting alkylated compounds will contain an excessive amount of unreacted wax. With substantially higher percentages of chlorine in the chlorwax, such as 18%, the reaction products tend to become gummy, rubbery, or resinous, exceedingly difficult to work without the aid of solvents and tend toward insolubility in oils.

The organic acylating agents used in the present invention may vary widely in nature. They may for instance correspond to the following: The monocarboxylic saturated, aliphatic acids having molecular weights as low as acetic acid and as high as montanic, such for example as acetic, butyric, capric, palmitic, stearic and montanic, corresponding respectively to the acyl radicals acetyl, butyryl, capryl, palmityl, stearoyl and montanyl; unsaturated aliphatic monobasic acids such as oleic and acrylic, corresponding to the acyl radicals oleyl and acrylyl; saturated aliphatic polybasic acids such as succinic, oxalic, adipic, sebacic, etc.; unsaturated aliphatic polybasic acids such as fumaric; substituted mono and polybasic aliphatic acids containing halogen, hydroxyl, amino, or keto groups such as chloracetic acid, tartaric acid, glycollic acid, pyruvic acid and acetoacetic acid; aromatic monobasic acids such as benzoic and naphthoic; aromatic polybasic acids such as phthalic; alkylene-substituted aromatic monobasic acids such as cinnamic; aryl-substituted mono and polybasic aliphatic acids with COOH in side chain such as xylic, phenylstearic, naphthylstearic and naphthylpolystearic, etc.; substituted aromatic mono and polybasic acids containing halogen, hydroxyl, amino, alkyl, aryl, aralkyl, keto, nitro or alkoxy in the ring such as chlorbenzoic, salicylic, anthranilic, toluic, phenylbenzoic, benzylbenzoic, nitrobenzoic, anisic and benzoylbenzoic acid; non-benzenoid cyclic mono and polycarboxylic acids such as naphthenic, abietic and camphoric acids and heterocyclic carboxylic acids such as furoic acid. In forming the acid chlorides of the hydroxy and/or amino substituted acids mentioned above it is desirable to first acylate these substituted groups before preparing the corresponding acyl chlorides. Of the above acylating agents those corresponding to benzoic, toluic, etc.; to the dicarboxylic aromatic acids of the class typified by phthalic acid; to acetic, and stearic, and to the aliphatic dibasic acids, as adipic, sebacic, and succinic acids yield the better results. In general, preference is for the dibasic acids.

These corresponding acylating agents may be conveniently used either in the form of the acid chloride, or where conveniently available, of the acid anhydride, both being applicable in esterification reactions, although in general the use of the acid chloride is preferred. By this means the esterification or acylation reaction may be conveniently carried out as a continuation of the original Friedel-Crafts reaction employed for the initial condensation of the hydroxyaromatic compound with the chlorwax. This method of synthesis also makes use of anhydrous aluminum chloride as a so-called catalyst and for this purpose aluminum chloride of the ordinary technical grade of purity may be used.

In the preparation of the novel pour point depressant with which this invention is concerned, the first step is the formation of a heavy alkyl-substituted hydroxyaromatic compound, which is accomplished by means of the Friedel-Crafts reaction between the hydroxyaromatic compound and chlorinated alkyl, as for instance between phenol ($C_6H_5OH$) and chlorwax. The proportions of these reagents may be so chosen that the resulting compound corresponds to a triwax-substituted or to a tetrawax-substituted hydroxyaromatic compound. For most purposes the tetrawax-substituted compound is preferred, although for many purposes a monowax-substituted compound is useful. This proportioning is accomplished by using chlorwax of a known chlorine content, and adjusting the relative amounts so that for one equivalent of hydroxyaromatic compound, there are not less than about three and not more than about four equivalents of chlorine present in the reaction mixture. After formation of the wax-substituted hydroxyaromatic compound, it is acylated by reacting it with the acylating agent containing the acyl acid radical. In this step of the process, the proportions are preferably those corresponding to theoretically complete esterification. Lesser proportions of the acyl radical may be used with correspondingly lesser improvement in stabilization, but a proportion corresponding to substantially complete esterification is preferred. In connection with this step of the process of the present invention, the term "acylation" is used herein in a generic sense. On the other hand since we have found that the major portion at least of the product resulting from the acylation of a wax-substituted phenol consists of an ester, and a minor proportion of ketones and other substances such as possibly lactones, the terms "esterification" and "ester" are frequently hereinafter used respectively in referring to the process and product of the present invention.

The procedure for forming these compounds is generally similar in all cases for the first step, viz., that of forming the wax-substituted or heavy alkyl-substituted hydroxyaromatic compound. The hydroxyaromatic compound and the chlorwax or other chlorinated heavy aliphatic hydrocarbon in suitable proportions are melted together and heated to a temperature of about 150° F., and then is added an amount of aluminum chloride corresponding to about 3% of the weight of the chlorinated aliphatic compound. Substantial variation from this preferred percentage will result in undesirable reaction temperatures, rates of reaction and formation of undesirable by-products. The mixture is then heated slowly to a temperature of about 350° F. the whole time required for such heating being about two hours. Evolution of hydrochloric acid gas usually ceases substantially when a temperature of about 350° F. is attained, but if this does not occur the mixture is held at this temperature for a short while longer or until such evolution of gas is substantially completed. The reaction mixture is then cooled to the temperature desired to be used in the esterification. Substantial deviation from the above procedure of heating and the temperature limits above outlined results in the formation of a reaction product which is much less desirable and frequently entirely objectionable for the purposes of this invention.

In the preferred acylation procedure, employing acid chlorides, the temperature of the reaction, in general should be below 350° F. and above 100° F., and under such conditions the esterification takes place almost immediately upon the addition of the acylating or esterifying agent or compound containing the acyl radical. The esterification reaction is therefore conveniently governed by the rate of addition of the acylating compound, and is complete when the evolution of hydrogen chloride has ceased after the addition of the last portion of the acylating agent. Varying temperatures and reaction rates may be employed in carrying out the esterification step as may be seen from the examples given further on. In carrying out the further step of esterification especially when this is done at low temperatures, which is sometimes desirable, and in the case of mixtures of relatively high viscosity, the reaction mixture may tend to foam too much, and thus reduce the speed of the esterification reaction to an objectionable degree. In such cases an appropriate inert diluent or solvent, such as for instance ethylenechloride may be added to the mixture to reduce its viscosity and thus prevent objectionable foaming.

After the formation of the ester product, the process of purifying the novel compounds of the class with which this invention is concerned is similar in each specific case and consists of thoroughly washing with water to remove all traces of aluminum chloride, it having been found that the presence of even comparatively small amounts of residual aluminum chloride results in a lower stability of the final product. Due to the strong tendency of the ester products to emulsify when being washed with water, this washing is sometimes difficult, but it may be conveniently accomplished by adding to the wash water a small amount of some substance capable of breaking the emulsion, as for instance, lower alcohols, such as butanol. A convenient method of purification has been found to consist of washing the reaction product about six times, each time with an equal volume of water which contains 2% of butanol.

Examples of the novel compounds of the general class with which this invention is concerned are cited below. In preparing these compounds there is first prepared the corresponding heavy alkyl-substituted or wax-substituted hydroxyaromatic compound or phenol, such for instance as tetrawax phenol, triwax benzyl phenol, triwax resorcinol, triwax-hydroxydiphenyl, tetrawax B-naphthol, and triwax p-cresol, these compounds being prepared from the reaction mixtures as shown under the Roman numerals I to VI inclusive below:

I. Tetrawax phenol
|  | Grams |
|---|---|
| Chlorwax | 800 |
| Phenol | 74 |
| AlCl$_3$ | 24 |

II. Triwax benzyl phenol
| Benzyl chloride | 66.4 |
|---|---|
| Phenol | 49.4 |
| AlCl$_3$ | 3.0 |
| Then chlorwax | 400 |
| AlCl$_3$ | 9 |

III. Triwax resorcinol
| Chlorwax | 400 |
|---|---|
| Resorcinol | 58 |
| AlCl$_3$ | 40 |

IV. Triwax o-hydroxydiphenyl
| Chlorwax | 400 |
|---|---|
| o-Hydroxydiphenyl | 67 |
| AlCl$_3$ | 12 |

V. Tetrawax B-naphthol
| Chlorwax | 400 |
|---|---|
| B-naphthol | 56.8 |
| AlCl$_3$ | 12 |

VI. Triwax p-cresol
| Chlorwax | 400 |
|---|---|
| p-Cresol | 56.8 |
| AlCl$_3$ | 12 |

The wax-substituted hydroxyaromatic products formed by the reaction according to the above examples are then further condensed with an acylating agent, such as acetyl chloride, stearoyl chloride, benzoyl chloride, phthalyl chloride, thionyl chloride, phosphoryl chloride, succinyl chloride, cinnamyl chloride, adipyl chloride, and montanoyl chloride. Since all of these reactions are in general similar, and in each case the proportions are such as to bring about esterification, detailed exemplary data will be limited to only a few of the various combinations of reaction mixtures referred to above, giving in each instance a short note describing the various specific reaction conditions.

VII. Tetrawax phenol condensed with acetyl chloride at 212° F.–300° F., time of reaction thirty minutes.
Reaction mixture
|  | Grams |
|---|---|
| Tetrawax phenol | 50 |
| Acetyl chloride | 7.8 |

VIII. Tetrawax phenol condensed with stearoyl chloride (acid chloride prepared from stearic acid of acid No. 210) at 250° F., time of reaction twenty minutes.
Reaction mixture
|  | Grams |
|---|---|
| Tetrawax phenol | 70 |
| Stearoyl chloride | 21.4 |

IX. Tetrawax phenol condensed with benzoyl chloride at 250° F.–300° F., time of reaction twenty minutes.
Reaction mixture
|  | Grams |
|---|---|
| Tetrawax phenol | 50 |
| Benzoyl chloride | 7.53 |

X. Tetrawax phenol condensed with phthalyl chloride at 175° F.–350° F., time of reaction fifteen minutes.
Reaction mixture
|  | Grams |
|---|---|
| Tetrawax phenol | 100 |
| Phthalyl chloride | 10.1 |

XI. Tetrawax B-naphthol condensed with montanoyl chloride (acid chloride prepared from montanoyl wax having acid No. 70) at 250° F.–350° F., time of reaction twenty minutes.
Reaction mixture
|  | Grams |
|---|---|
| Tetrawax B-naphthol | 50 |
| Montanoyl chloride wax | 42 |

(In this case, after water-washing, the product is heated to 350° F. at a pressure of 5 mm. abs. to remove wax.)

XII. Tetrawax phenol condensed with thionyl chloride at 100° F.–195° F., time of reaction thirty minutes.
Reaction mixture
| Tetrawax phenol | grams | 50 |
|---|---|---|
| Thionyl chloride | do | 50.5 |
| Ethylene chloride | c. c. | 50 |

XIII. Tetrawax phenol condensed with phosphorus oxychloride at 150° F.–195° F., time of reaction thirty minutes.
Reaction mixture
| Tetrawax phenol | Grams | 50 |
|---|---|---|
| Phosphorus oxychloride | Grams | 2.55 |
| Ethylene chloride | c. c. | 50 |

The product, in each of the above instances is finally purified by water-washing in the manner outlined in the above general discussion.

In some instances, in preparing the heavy alkyl-substituted or wax-substituted phenol, as for instance in the preparation of triwax resorcinol, and in connection with certain other phenols which react in the Friedel-Crafts synthesis with a slightly greater difficulty than do the unsubstituted monohydroxyaromatic hydrocarbons for example, the proportion of aluminum chloride may conveniently be increased somewhat. In various of the esterification syntheses when the reaction mixture is highly viscous at the desired reaction temperature, as in the case of the reaction of triwax resorcinol and acetyl chloride at 150° F.–350° F., a diluent such as ethylene chloride may be used to reduce the viscosity of the mixture to permit initiating the reaction with reasonable velocity. The diluent may be removed conveniently by allowing it to distill off as the temperature of the reaction is raised in the normal procedure. In other instances where there is some tendency for the reaction to proceed toward a resinification in the course of the esterification, as for instance when reacting tetrawax B-naphthol with phthalyl chloride, similar diluents may be used to reduce the viscosity of the reaction mixture and then may be removed by similar procedural steps.

The novel compositions of matter of the present invention, when the acyl radical contained therein corresponds to an organic acid, include a large group of products whose characterizing constituents are compounds typified by the general formula (1) 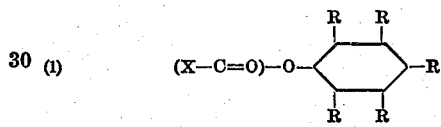

wherein (X—C=O) is a monovalent acyl radical of a monobasic or polybasic organic carboxylic acid typified by those acids of this class enumerated hereinbefore, and wherein R has the same significance as that outlined above and wherein X preferably is a radical selected from the group consisting of alkyl and aryl radicals, saturated and unsaturated, and which may or may not be substituted or oxidized, (as to a ketone form), in any manner which will not have a substantial effect upon the esterifying activity derived from the carboxyl group to which it is attached.

Similarly the said compositions of the present invention of the class derived from organic acids comprises a second group of products whose characterizing constituents are compounds typified by the general formulae (2) 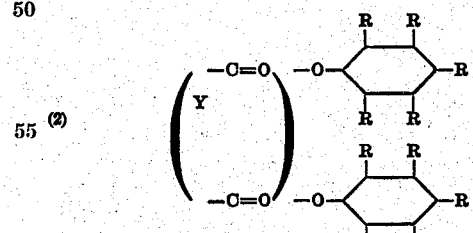

wherein

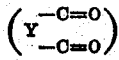

is the divalent acyl radical of a dibasic organic carboxylic acid typified by those dibasic organic carboxyl acids enumerated hereinbefore, and wherein R has the same significance as above and Y is a divalent aliphatic or aromatic redical or like substituted radical in which the substituent is known to have no substantial effect upon the esterifying activity of the acyl group to which such radicals are attached; and wherein

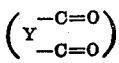

is preferably a divalent phthalyl radical in which event Formula (2) above becomes

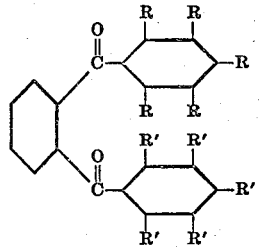

As indicated hereinbefore the compositions of the present invention also comprise products containing trivalent acyl radicals derived in the manner indicated above from organic carboxylic acids, containing three carboxyl groups, the general formula corresponding to which and hereinafter referred to as general Formula (3) will be evident from the above discussion of the general Formulae (1) and (2).

In the general Formulae (1), (2) and (3) a two ring or three ring condensed aromatic nucleus corresponding to naphthalene and anthracene may be substituted for the single ring shown in Formulae (1) and (2) with a corresponding increased number of R's; and of the R's indicated, preferably three at least consist of a long chain alkyl radical corresponding to an aliphatic hydrocarbon of relatively high molecular weight, the remaining R's being preferably hydrogen.

We have also found that the inorganic acid radicals such as carbonyl, sulphonyl, thionyl, phosphoryl and pyro-phosphoryl, corresponding to carbonic, sulphurous, sulphuric, phosphorous, and phosphoric acids may be used in accordance with the present invention in place of or in combination with the acyl radicals of the organic acids indicated above.

When the acylating agent used corresponds to an inorganic oxy-acid, the novel compounds of the present invention include a group of compounds corresponding to the general formula (4) 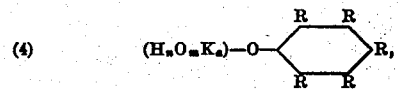

where $(H_nO_mK_a)$ is a monovalent inorganic acyl radical, the same variations holding good with respect to the ring portion of the structure shown, and as to di, tri and polyvalent acyl radicals and as to the significance of the R's as those outlined above, and wherein K is an inorganic acid-forming element selected from the group consisting of phosphorous, sulphur, etc., and where $n$, $m$ and $a$ are whole numbers corresponding to the composition of the acyl radical. ($n$ may be $o$.) The present invention also includes products corresponding to the general Formula (4) and its variations indicated above in which $H_n$ is substituted by aryl or alkyl groups or other substituents known to have no substantial adverse effect upon the esterifying activity of the acyl group to which it is attached.

It should be understood that the symbols

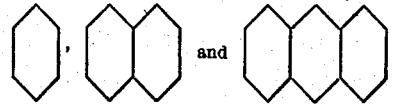

used herein and in the appended claims represent the well known carbon atom nuclei of benzene, naphthalene, and anthracene, respectively.

While the novel compositions of matter of the present invention are useful for various purposes as for instance in the preparation of artificial or so-called synthetic resins and for the production of coating compositions, some are particularly useful as pour point depressants for petroleum lubricant oils as outlined above and for this latter purpose we prefer to employ those which are oil-soluble inert and substantially stable toward oxidation at temperatures of normal use and which are also substantially neutral or non-corrosive toward the metal parts to be lubricated. Such compounds may be employed for this purpose either singly or in admixture with each other or in solution in suitable oil-soluble solvents.

We claim:

1. The method of making a novel composition of matter that comprises reacting a hydroxy-aromatic compound selected from the group consisting of compounds of the general formulae

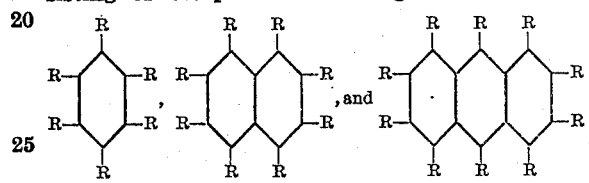

wherein at least one R is a hydroxyl group and the remaining R's represent radicals chosen from the group consisting of hydrogen, alkyl, aryl, alkaryl, aralkyl, aroxy, and alkoxy with an aliphatic material of the general order of molecular weight of the hydrocarbons found in heavy petroleum lubricating oils, petrolatum and crystalline petroleum wax, which material has been chlorinated to the extent of about 14%, the reaction between the chlorinated aliphatic material and the hydroxyaromatic material being accomplished by melting together one molecular proportion of the hydroxyaromatic material and about 3 to 4 molecular proportions of the chlorinated aliphatic material, heating the mixture to around 150 degrees F., adding from about 3% to about 10% of a Friedel-Crafts catalyst, this percentage being based on the chlorinated aliphatic material, heating the mixture slowly to about 350 degrees F., and reacting the resulting product at a temperature between about 100 degrees F. and about 350 degrees F. with an acylating agent.

2. The method of making a novel composition of matter that comprises reacting a hydroxy-aromatic compound selected from the group consisting of compounds of the general formulae

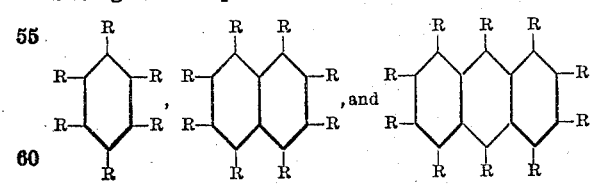

wherein at least one R is a hydroxyl group and the remaining R's represent radicals chosen from the group consisting of hydrogen, alkyl, aryl, alkaryl, aralkyl, aroxy, and alkoxy with an aliphatic material of the general order of molecular weight of crystalline petroleum wax, which material has been chlorinated to the extent of about 14%, the reaction between the chlorinated aliphatic material and the hydroxyaromatic material being accomplished by melting together one molecular proportion of the hydroxyaromatic material and about 3 to 4 molecular proportions of the chlorinated aliphatic material, heating the mixture to around 150 degrees F., adding from about 3% to about 10% of aluminum chloride, this percentage being based on the chlorinated aliphatic material, heating the mixture slowly to about 350 degrees F., and reacting the resulting product at a temperature between about 100 degrees F. and about 350 degrees F. with an acylating agent.

3. The method of making a novel composition of matter that comprises reacting a hydroxy-aromatic compound selected from the group consisting of compounds of the general formulae

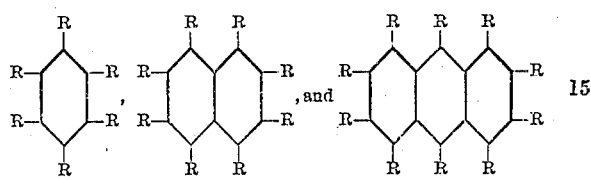

wherein at least one R is a hydroxyl group and the remaining R's represent radicals chosen from the group consisting of hydrogen, alkyl, aryl, alkaryl, aralkyl, aroxy, and alkoxy with an aliphatic material of the general order of molecular weight of crystalline petroleum wax, which material has been chlorinated to the extent of about 14%, the reaction between the chlorinated aliphatic material and the hydroxyaromatic material being accomplished by melting together one molecular proportion of the hydroxyaromatic material and about 3 to 4 molecular proportions of the chlorinated aliphatic material, heating the mixture to around 150 degrees F., adding from about 3% to about 10% of a Friedel-Crafts catalyst, this percentage being based on the chlorinated aliphatic material, heating the mixture slowly to about 350 degrees F., and reacting the resulting product at a temperature between about 100 degrees F. and about 350 degrees F. with an acylating agent of the class consisting of acid chlorides and acid anhydrides.

4. The method of making a novel composition of matter that comprises reacting a hydroxy-aromatic compound selected from the group consisting of compounds of the general formulae

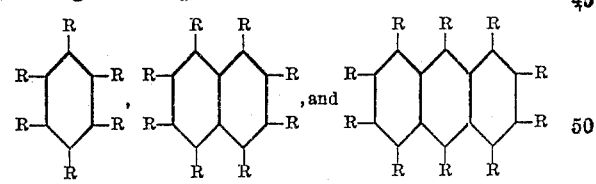

wherein at least one R is a hydroxyl group and the remaining R's represent radicals chosen from the group consisting of hydrogen, alkyl, aryl, alkaryl, aralkyl, aroxy, and alkoxy with an aliphatic material of the general order of molecular weight of crystalline petroleum wax, which material has been chlorinated to the extent of about 14%, the reaction between the chlorinated aliphatic material and the hydroxyaromatic material being accomplished by melting together one molecular proportion of the hydroxy-aromatic material and about 3 to 4 molecular proportions of the chlorinated aliphatic material, heating the mixture to around 150 degrees F., adding from about 3% to about 10% of aluminum chloride, this percentage being based on the chlorinated aliphatic material, heating the mixture slowly to about 350 degrees F., reacting with the mixture, at a temperature between about 100 degrees F. and about 350 degrees F. an organic acid chloride.

5. The method of making a novel composition of matter that comprises reacting a hydroxyaromatic compound selected from the group consisting of compounds of the general formulae

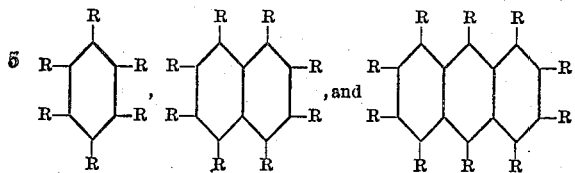

wherein at least one R is a hydroxyl group and the remaining R's represent radicals chosen from the group consisting of hydrogen, alkyl, aryl, alkaryl, aralkyl, aroxy, and alkoxy with an aliphatic material of the general order of molecular weight of crystalline petroleum wax, which material has been chlorinated to the extent of about 14%, the reaction between the chlorinated aliphatic material and the hydroxyaromatic material being accomplished by melting together one molecular proportion of the hydroxyaromatic material and about 3 to 4 molecular proportions of the chlorinated aliphatic material, heating the mixture to around 150 degrees F., adding from about 3% to about 10% of aluminum chloride, this percentage being based on the chlorinated aliphatic material, heating the mixture slowly to about 350 degrees F., reacting with the mixture, at a temperature between about 100 degrees F. and about 350 degrees F. an acylating agent essentially comprising phthalyl chloride.

6. The method of making a novel composition of matter that comprises reacting phenol with crystalline petroleum wax chlorinated to the extent of about 14%, the reaction between the chlorinated wax and the hydroxyaromatic material being accomplished by melting together one molecular proportion of the hydroxyaromatic material and about four molecular proportions of the chlorinated wax, heating the mixture to around 150 degrees F., adding about 3% of aluminum chloride, the percentage being based on the chlorinated wax, heating the mixture slowly to about 350 degrees F. and mixing with the mixture at a temperature between about 100 degrees F. and 350 degrees F., an acylating agent essentially comprising phthalyl chloride.

7. A novel composition of matter that comprises the product formed by reacting a hydroxyaromatic compound selected from the group consisting of compounds of the general formulae

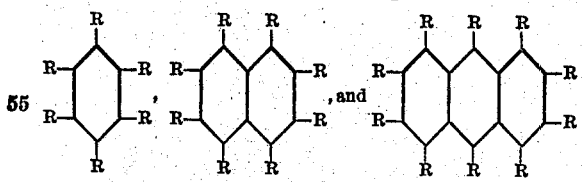

wherein at least one R is a hydroxyl group and the remaining R's represent radicals chosen from the group consisting of hydrogen, alkyl, aryl, alkaryl, aralkyl, aroxy, and alkoxy with an aliphatic material of the general order of molecular weight of the hydrocarbons found in heavy petroleum lubricating oils, petrolatum and crystalline petroleum wax, which material has been chlorinated to the extent of about 14%, the reaction between the chlorinated aliphatic material and the hydroxyaromatic material being accomplished by melting together one molecular proportion of the hydroxyaromatic material and about 3 to 4 molecular proportions of the chlorinated aliphatic material, heating the mixture to around 150 degrees F., adding from about 3% to about 10% of a Friedel-Crafts catalyst, this percentage being based on the chlorinated aliphatic material, heating the mixture slowly to about 350 degrees F., and reacting the resulting product at a temperature between about 100 degrees F. and about 350 degrees F. with an acylating agent.

8. A novel composition of matter that comprises the product formed by reacting a hydroxyaromatic compound selected from the group consisting of compounds of the general formulae

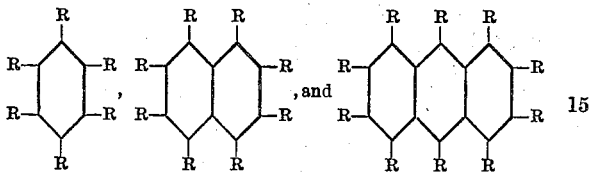

wherein at least one R is a hydroxyl group and the remaining R's represent radicals chosen from the group consistng of hydrogen, alkyl, aryl, alkaryl, aralkyl, aroxy, and alkoxy with an aliphatic material of the general order of molecular weight of crystalline petroleum wax, which material has been chlorinated to the extent of about 14%, the reaction between the chlorinated aliphatic material and the hydroxyaromatic material being accomplished by melting together one molecular proportion of the hydroxyaromatic material and about 3 to 4 molecular proportions of the chlorinated aliphatic material, heating the mixture to around 150 degrees F., adding from about 3% to about 10% of aluminum chloride, this percentage being based on the chlorinated aliphatic material, heating the mixture slowly to about 350 degrees F., and reacting the resulting product at a temperature between about 100 degrees F. and about 350 degrees F. with an acylating agent.

9. A novel composition of matter that comprises the product formed by reacting a hydroxyaromatic compound selected from the group consisting of compounds of the general formulae

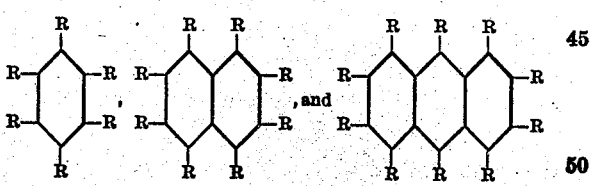

wherein at least one R is a hydroxyl group and the remaining R's represent radicals chosen from the group consisting of hydrogen, alkyl, aryl, alkaryl, aralkyl, aroxy, and alkoxy with an aliphatic material of the general order of molecular weight of crystalline petroleum wax, which material has been chlorinated to the extent of about 14%, the reaction between the chlorinated aliphatic material and the hydroxyaromatic material being accomplished by melting together one molecular proportion of the hydroxyaromatic material and about 3 to 4 molecular proportions of the chlorinated aliphatic material, heating the mixture to around 150 degrees F., adding from about 3% to about 10% of a Friedel-Crafts catalyst, this percentage being based on the chlorinated aliphatic material, heating the mixture slowly to about 350 degrees F., and reacting the resulting product at a temperature between about 100 degrees F. and about 350 degrees F. with an acylating agent of the class consisting of acid chlorides and acid anhydrides.

10. A novel composition of matter that comprises the product formed by reacting a hydroxyaromatic compound selected from the group consisting of compounds of the general formulae

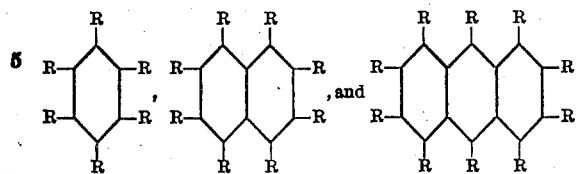

wherein at least one R is a hydroxyl group and the remaining R's represent radicals chosen from the group consisting of hydrogen, alkyl, aryl, alkaryl, aralkyl, aroxy, and alkoxy with an aliphatic material of the general order of molecular weight of crystalling petroleum wax, which material has been chlorinated to the extent of about 14%, the reaction between the chlorinated aliphatic material and the hydroxyaromatic material being accomplished by melting together one molecular proportion of the hydroxyaromatic material and about 3 to 4 molecular proportions of the chlorinated aliphatic material, heating the mixture to around 150 degrees F., adding from about 3% to about 10% of aluminum chloride, this percentage being based on the chlorinated aliphatic material, heating the mixture slowly to about 350 degrees F., reacting with the mixture, at a temperature between about 100 degrees F. and about 350 degrees F. an organic acid chloride.

11. A novel composition of matter that comprises the product formed by reacting a hydroxyaromatic compound selected from the group consisting of compounds of the general formulae

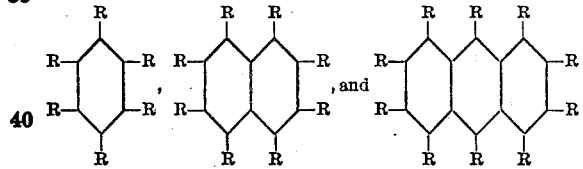

wherein at least one R is a hydroxyl group and the remaining R's represent radicals chosen from the group consisting of hydrogen, alkyl, aryl, alkaryl, aralkyl, aroxy, and alkoxy with an aliphatic material of the general order of molecular weight of crystalline petroleum wax, which material has been chlorinated to the extent of about 14%, the reaction between the chlorinated aliphatic material and the hydroxyaromatic material being accomplished by melting together one molecular proportion of the hydroxyaromatic material and about 3 to 4 molecular proportions of the chlorinated aliphatic material, heating the mixture to around 150 degrees F., adding from about 3% to about 10% of aluminum chloride, this percentage being based on the chlorinated aliphatic material, heating the mixture slowly to about 350 degrees F., reacting with the mixture, at a temperature between about 100 degrees F. and about 350 degrees F. an acylating agent essentially comprising phthalyl chloride.

12. A novel composition of matter that comprises the product formed by reacting phenol with crystalline petroleum wax chlorinated to the extent of about 14%, the reaction between the chlorinated wax and the hydroxyaromatic material being accomplished by melting together one molecular proportion of the hydroxyaromatic material and about four molecular proportions of the chlorinated wax, heating the mixture to around 150 degrees F., adding about 3% of aluminum chloride, the percentage being based on the chlorinated wax, heating the mixture slowly to about 350 degrees F., and mixing with the mixture at a temperature between about 100 degrees F. and 350 degrees F., an acylating agent essentially comprising phthalyl chloride.

13. The method of making a novel composition of matter that comprises reacting a hydroxyaromatic compound selected from the group consisting of compound of the general formulae

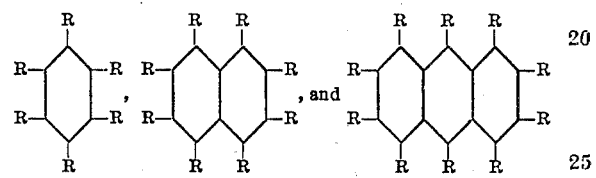

wherein at least one R is a hydroxy group, the remaining R's represent radicals chosen from the group consisting of hydrogen, alkyl, aryl, alkaryl, aralkyl, aroxy and alkoxy, with an aliphatic material of the general order of the molecular weight of the hydrocarbons found in heavy petroleum lubricating oils, petrolatum and crystalline petroleum wax, which material has been chlorinated, the reaction between the chlorinated aliphatic material and the hydroxyaromatic material being accomplished by melting together one molecular proportion of the hydroxyaromatic material and about three to four molecular proportions of the chlorinated aliphatic material, while the mixture is above its melting point adding a Friedel-Crafts catalyst, hydrochloric acid gas being evolved at the time of the addition, heating the mixture slowly until a second evolution of hydrochloric acid occurs, and reacting the resulting product at a temperature between about 100° F. and about 350° F. with an acylating agent.

14. A new composition of matter comprised essentially of a compound having a composition corresponding to the general formula

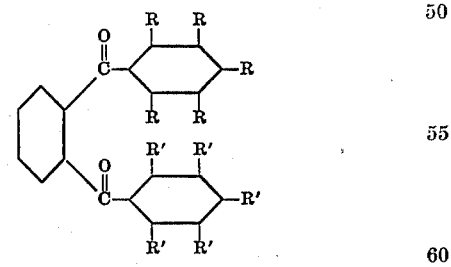

wherein at least four of the R's and four of the R''s are heavy alkyl radicals corresponding to those which characterize petroleum wax.

ORLAND M. REIFF.
DARWIN E. BADERTSCHER.

CERTIFICATE OF CORRECTION.

Patent No. 2,138,809.                                            November 29, 1938.

ORLAND M. REIFF, ET AL.

It is hereby certified that error appears in the printed specification of the above numbered patent requiring correction as follows: Page 1, second column, line 19, for the word "character" read characterize; page 3, first column, line 31, for "triwax-hydroxydiphenyl" read triwax-o-hydroxydiphenyl; page 4, first column, line 68, for "redical" read radical; page 7, first column, line 16, claim 10, for "crystalling" read crystalline; and second column, line 18, claim 13, for "compound" read compounds; and that the said Letters Patent should be read with this correction therein that the same may conform to the record of the case in the Patent Office.

Signed and sealed this 21st day of February, A.D. 1939.

Henry Van Arsdale.

(Seal)                                                                  Acting Commissioner of Patents.